US010716295B2

(12) United States Patent
Nelson et al.

(10) Patent No.: US 10,716,295 B2
(45) Date of Patent: Jul. 21, 2020

(54) NESTABLE BEE SWARM BOX

(71) Applicant: Jeff Nelson, Lebannon, OH (US)

(72) Inventors: Jeff Nelson, Lebanon, OH (US); Timothy Michael Obrzut, Middleburg Heights, OH (US)

(73) Assignee: Jeff Nelson, Lebanon, OH (US)

( * ) Notice: Subject to any disclaimer, the term of this patent is extended or adjusted under 35 U.S.C. 154(b) by 718 days.

(21) Appl. No.: 15/297,369

(22) Filed: Oct. 19, 2016

(65) Prior Publication Data

US 2018/0103618 A1    Apr. 19, 2018

(51) Int. Cl.
*A01K 57/00* (2006.01)

(52) U.S. Cl.
CPC .................... *A01K 57/00* (2013.01)

(58) Field of Classification Search
CPC ........ A01K 57/00; A01K 47/00; A01K 47/06; A01K 49/00; A01K 59/00
USPC ....... 206/454, 710, 711, 485, 504, 505, 518, 206/507; 220/4.24, 4.21, 532, 533
See application file for complete search history.

(56) References Cited

U.S. PATENT DOCUMENTS

| 427,993 | A | | 5/1890 | Hopkins |
| 1,371,318 | A | | 3/1921 | McMonigal |
| 1,871,595 | A | | 8/1932 | Eldred |
| 2,709,820 | A | | 6/1955 | Franklin |
| 2,935,108 | A | * | 5/1960 | Hall .................. B65D 43/0212 220/324 |
| 3,842,457 | A | | 10/1974 | Johnson |
| 4,593,816 | A | * | 6/1986 | Langenbeck .......... B65D 25/06 206/425 |
| 4,848,574 | A | * | 7/1989 | Murphy ............. G11B 33/0433 206/308.3 |
| 4,892,213 | A | * | 1/1990 | Mason, Jr. ............. A47G 19/02 206/508 |

(Continued)

FOREIGN PATENT DOCUMENTS

| CN | 104521806 A | | 4/2015 | |
| FR | 2603769 A1 | * | 3/1988 | ............. A01K 47/00 |

(Continued)

OTHER PUBLICATIONS

Tillman, Linda D., "Linda's Bees: Making a Homemade Swarm Trap," http://beekeeperlinda.blogspot.com/2012/03/making-homemade-swarm-trap.html, Mar. 4, 2012 (13 pages).

(Continued)

*Primary Examiner* — Son T Nguyen
(74) *Attorney, Agent, or Firm* — Wood Herron & Evans LLP

(57) ABSTRACT

A bee swarm box and associated method of use is disclosed. The bee swarm box includes a first and second body portions. The first and second body portions are convertible between a closed configuration and a nested configuration. In the closed configuration, the first and second body portions are brought together forming an internal cavity configured to receive bees and a first plurality of framelike elements. In the nested configuration, the first aligning portion of the first body portion projects so as to nest with the first aligning portion of the second body portion, aiding the first and second body portions in forming the nested configuration. The nested configuration saves space when transporting the bee swarm box between locations.

10 Claims, 17 Drawing Sheets

(56) References Cited

U.S. PATENT DOCUMENTS

| | | | | |
|---|---|---|---|---|
| 4,976,373 A * | 12/1990 | Perdue, Jr. | ............... | B42F 17/08 |
| | | | | 206/308.3 |
| 5,042,674 A * | 8/1991 | Ramsay | ............. | B65D 21/0219 |
| | | | | 206/505 |
| 5,332,114 A * | 7/1994 | Sano | ................. | B65D 21/0223 |
| | | | | 206/505 |
| 6,311,858 B1 * | 11/2001 | Csiszar | ................ | B65D 21/083 |
| | | | | 220/4.03 |
| 8,066,149 B2 * | 11/2011 | Strange | .............. | B65D 21/0223 |
| | | | | 206/508 |
| 2007/0095695 A1 * | 5/2007 | Smith | .................... | B42F 17/08 |
| | | | | 206/425 |
| 2008/0169216 A1 * | 7/2008 | Kaltz | ................. | B65D 21/0212 |
| | | | | 206/507 |
| 2012/0199513 A1 * | 8/2012 | Wagner | ............. | B65D 21/0233 |
| | | | | 206/505 |
| 2013/0273807 A1 | 10/2013 | Petro | | |
| 2014/0220859 A1 | 8/2014 | McCutchan | | |
| 2016/0029603 A1 | 2/2016 | Heidinger | | |

FOREIGN PATENT DOCUMENTS

| | | |
|---|---|---|
| RU | 2156570 C2 | 9/2000 |
| SU | 1052200 A1 | 11/1983 |

OTHER PUBLICATIONS

Warren, Tom, "A Whole 'Nother Bee Blog: Swarm Trap / Bait Hive," http://awholenotherbeeblog.blogspot.com/2010/06/swarm-trap-bait-hive.html, Jun. 10, 2010 (7 pages).

* cited by examiner

NESTABLE BEE SWARM BOX

TECHNICAL FIELD

The present invention relates generally to managing bee populations, and more particularly, to a bee swarm box having first and second body portions that are convertible between multiple configurations.

BACKGROUND

Swarming is the process by which a new bee colony is formed when the queen bee leaves the colony with a large group of worker bees. In the prime swarm, about 60% of the worker bees leave the original hive location with the old queen.

A bee swarm box is used to collect bees that are swarming. However, conventional bee swarm boxes have many disadvantages. For example, conventional bee swarm boxes do not accept conventional beehive frames, are not durable, are not easily cleaned, and cannot be easily transported between locations. Therefore, a need exists for a bee swarm box that allows for convenient shipping and storage, while also easily forming a bee swarm box that is durable by holding up to repeated use while being easy to clean.

SUMMARY

According to an exemplary embodiment, the bee swarm box includes first and second body portions. The first body portion includes a plurality of side walls extending from an end wall to form an internal cavity. The end wall includes a first plurality of generally parallel internal slots configured to receive first ends of a first plurality of framelike elements. The second body portion includes a plurality of side walls extending from an end wall to form an internal cavity. The end wall of the second body portion includes a first plurality of generally parallel internal slots configured to receive second ends of the first plurality of framelike elements. The second ends are disposed opposite the first ends. The first and second body portions are convertible between a closed configuration and a nested configuration. In the closed configuration, the internal cavities of the first and second body portions are brought together and configured to both receive bees and enclose the first plurality of framelike elements. The spacing between the first plurality of generally parallel internal slots of the first and second body portions is configured to allow for sufficient space for the bees to build a hive between adjacent ones of the plurality of framelike elements. In the nested configuration, the end wall of the first body portion is inserted into the internal cavity of the second body portion so that the plurality of side walls of the first body portion contact the plurality of side walls of the second body portion in adjacent relation. The nested configuration saves space when transporting the bee swarm box between locations.

According to another exemplary embodiment, the bee swarm box includes first and second body portions. The first body portion includes a first aligning portion and a first plurality of generally parallel internal slots configured to receive the first ends of a first plurality of framelike elements. The second body portion includes a first aligning portion and a first plurality of generally parallel internal slots configured to receive the second ends of the first plurality of framelike elements, with the second ends being disposed opposite the first ends. The first and second body portions are convertible between a closed configuration and a nested configuration. In the closed configuration, the first and second body portions are brought together forming an internal cavity configured to receive bees and the first plurality of framelike elements. In the nested configuration, the first aligning portion of the first body portion projects so as to nest with the first aligning portion of the second body portion aiding the first and second body portions in forming the nested configuration. The nested configuration saves space when transporting the bee swarm box between locations.

According to some embodiments, each of the first and second body portions may include at least first and second side walls projecting from an end wall. The first side wall may include the first aligning portion, while the second side wall is disposed opposite the first side wall and may include a second aligning portion. The end wall includes a first plurality of generally parallel internal slots and/or a second plurality of generally parallel internal slots configured to receive a second plurality of framelike elements. The first and second aligning portions of the first and second body portions may have inwardly tapering surfaces to further aid the first and second body portions in converting between the nested configuration and the closed configuration.

According to some embodiments, each of the first and second body portions may include at least one locking structure and at least one receiving structure that are integrally formed as a unitary piece with the respective first and second body portions. The locking structure locks with the receiving structure of the other of the first or second body portions to lock the first and second body portions together. According to an exemplary embodiment, the locking structure may include a triangular shaped head element and a shoulder portion, while the receiving structure may include a rectangular aperture and receiving surface. The triangular shaped head element may pass through the aperture allowing the shoulder portion to contact the receiving surface to lock the first and second body portions together.

According to some embodiments, each of the first and second body portions may include a first entrance portion disposed on a side wall of the respective first and second body portions. The first entrance portions align in the closed configuration to collectively form an entrance for bees to enter and exit the bee swarm box.

According to some embodiments, the nested configuration reduces the space occupied by the first and second portions by at least 50%, and preferably by at least 67%. The bee swarm box may be made from a polymeric material providing for durability and ease of cleaning. The internal cavity in the closed configuration has a volume of approximately one cubic foot. The first and second body portions may be exactly identical allowing the first and second body portions to be used interchangeably.

A method of using a bee swarm box is also described. The method includes separating first and second body portions. The method also includes inserting first ends of a first plurality of framelike elements into a first plurality of generally parallel internal slots of the first body portion. The method also includes aligning second ends of the first plurality of framelike elements disposed opposite the first ends into a first plurality of generally parallel internal slots of the second body portion. The method also includes enclosing the first and second body portions to form an internal cavity configured to receive bees and the first plurality of framelike elements. The method also includes attaching the bee swarm box to a structure.

In some embodiment, separating first and second body portions may include separating first and second body portions using a first aligning portion of the first body portion that slideably contacts a first aligning portion of the second body portion.

Other objects, features and advantages of the present invention will be readily understood after reading the following detailed description together with the accompanying drawings.

BRIEF DESCRIPTION OF THE DRAWINGS

The accompanying drawings, which are incorporated in and constitute a part of this specification, illustrate embodiments of the invention and, with a detailed description of the embodiments given below, serve to explain the principles of the invention.

DETAILED DESCRIPTION

Figure 1:
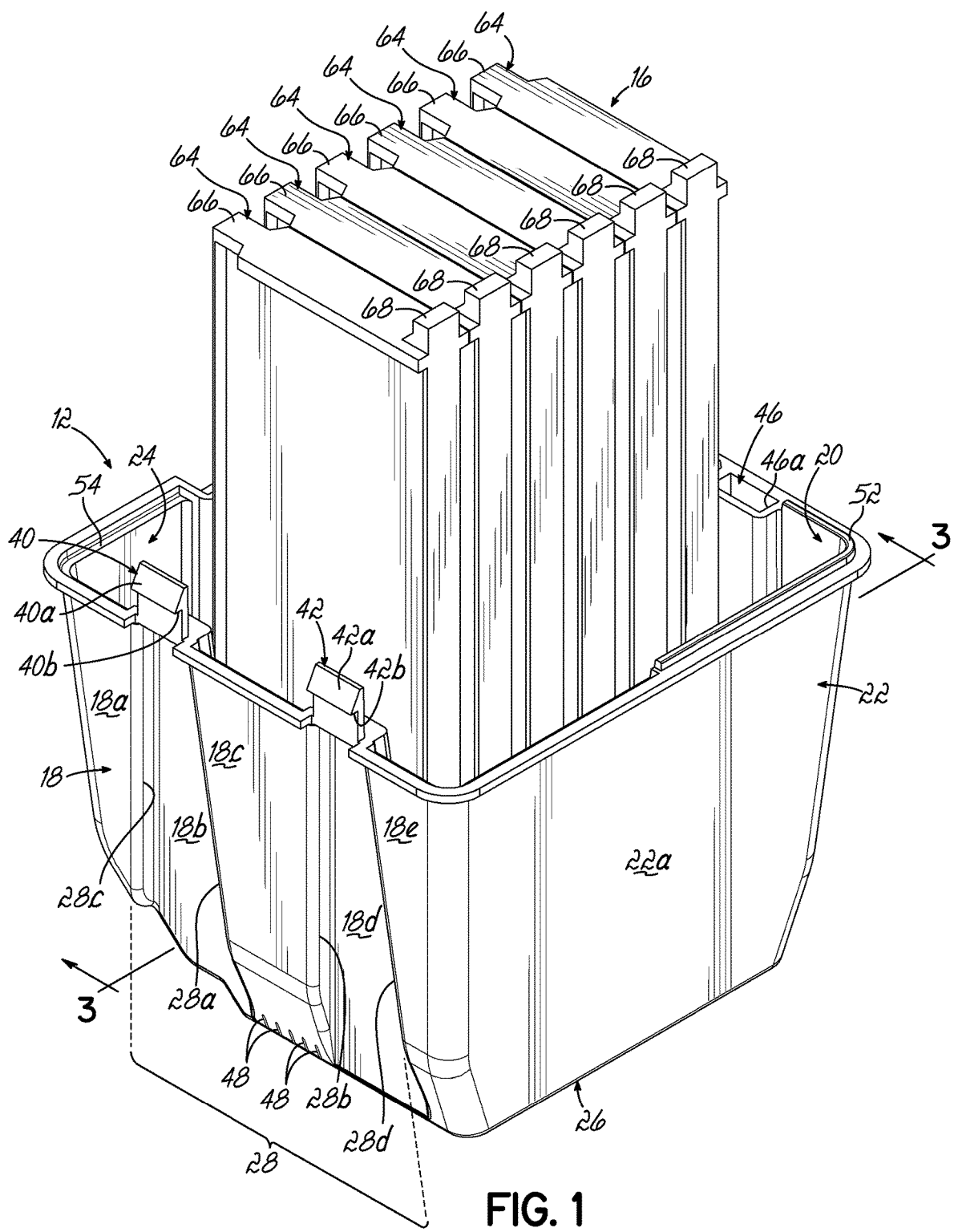
FIG. 1 is a front perspective view of an exemplary first body portion of a bee swarm box with a first plurality of framelike elements inserted into a space defined within the first body portion, in accordance with the principles of the present invention.
Figure 1A:
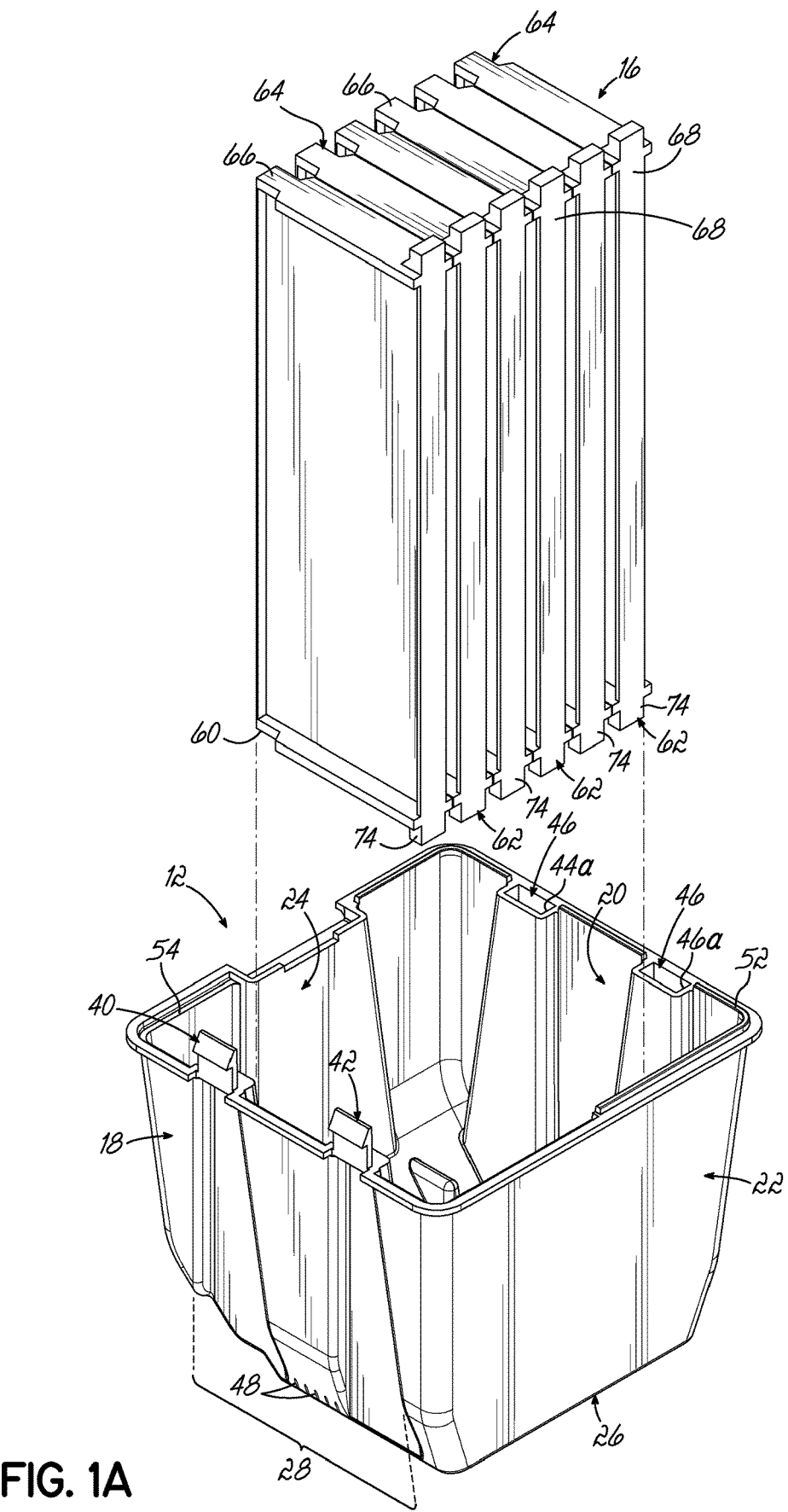
FIG. 1A is a perspective view similar to FIG. 1, with the first plurality of framelike elements being exploded apart from the first body portion.

Referring now to FIGS. 1-9, a bee swarm box 10 is shown according to an exemplary embodiment. The bee swarm box 10 includes a first body portion 12 and a second body portion 112 (shown in FIGS. 7-9). The first and second body portions 12, 112 are convertible between a nested configuration (shown in FIG. 7) and a closed configuration having an internal cavity 14 (shown in FIG. 9). As will be described in greater detail below, the nested configuration saves space when transporting the bee swarm box 10 between locations, while the closed configuration is configured to hold a first plurality of framelike elements 16. As shown in FIGS. 1 and 1A, the first plurality of framelike elements 16 includes six individual framelike elements, specifically in the form of conventional sized bee hive frames. However, more or fewer framelike elements may be used, and may even be preferred in other embodiments. Additionally, it has been discovered that the bees will build their hive in the bee swarm box 10 in the desired manner even without the use of any framelike elements, using the generally parallel internal slots (described in greater detail below) as a guide to start the structure.

Advantageously, the first and second body portions 12, 112 are exactly identical allowing the first and second body portions 12, 112 to be used interchangeably. For this reason, persons skilled in the art would appreciate that principles pertaining to the first body portion 12 may apply equally to the second body portion 112. Indeed, the same reference numbers in the "100" series will be used herein for identical elements of the second body portion 112 without further detailed explanation herein. This interchangeability also enables a single mold cavity to be used to produce both the first and second body portions 12, 112 to eliminate the need (and the associated cost) of obtaining a second mold cavity. However, persons skilled in the art would also appreciate that the first and second body portions 12, 112 do not need to be identical for the first and second body portions 12, 112 to suitably convert between the nested and closed configurations. Instead, it may be beneficial for the first and second body portions 12, 112 to be structurally different in one or more ways so as to accommodate non-standard frames, to enable the bee swarm box 10 to have different volumes, and/or for other various reasons, while remaining within the scope of this disclosure.

Turning with specific reference to FIG. 1, the first body portion 12 includes a first side wall 18, a second side wall 20, a third side wall 22, and a fourth side wall 24, each projecting from an end wall 26. The first side wall 18 is disposed opposite the second side wall 20 and adjacent the third and fourth side walls 22, 24, while the third side wall 22 is disposed opposite the fourth side wall 24 and adjacent the first and second side walls 18, 20. The first, second, third, and fourth side walls 18, 20, 22, 24 may define narrowing wall contours to aid in forming the nested configuration. As shown, the first side wall 18 has first narrowing portions 18a-e, the second side wall 20 has second narrowing portions 20a-e, the third side wall 22 has a third narrowing portion 22a, and the fourth side wall 24 has fourth narrowing portions 24a-c.

The first, second, third, and/or fourth side walls 18, 20, 22, 24 may include one or more aligning portions to help align the first body portion 12 with the second body portion 112.

Figure 2:
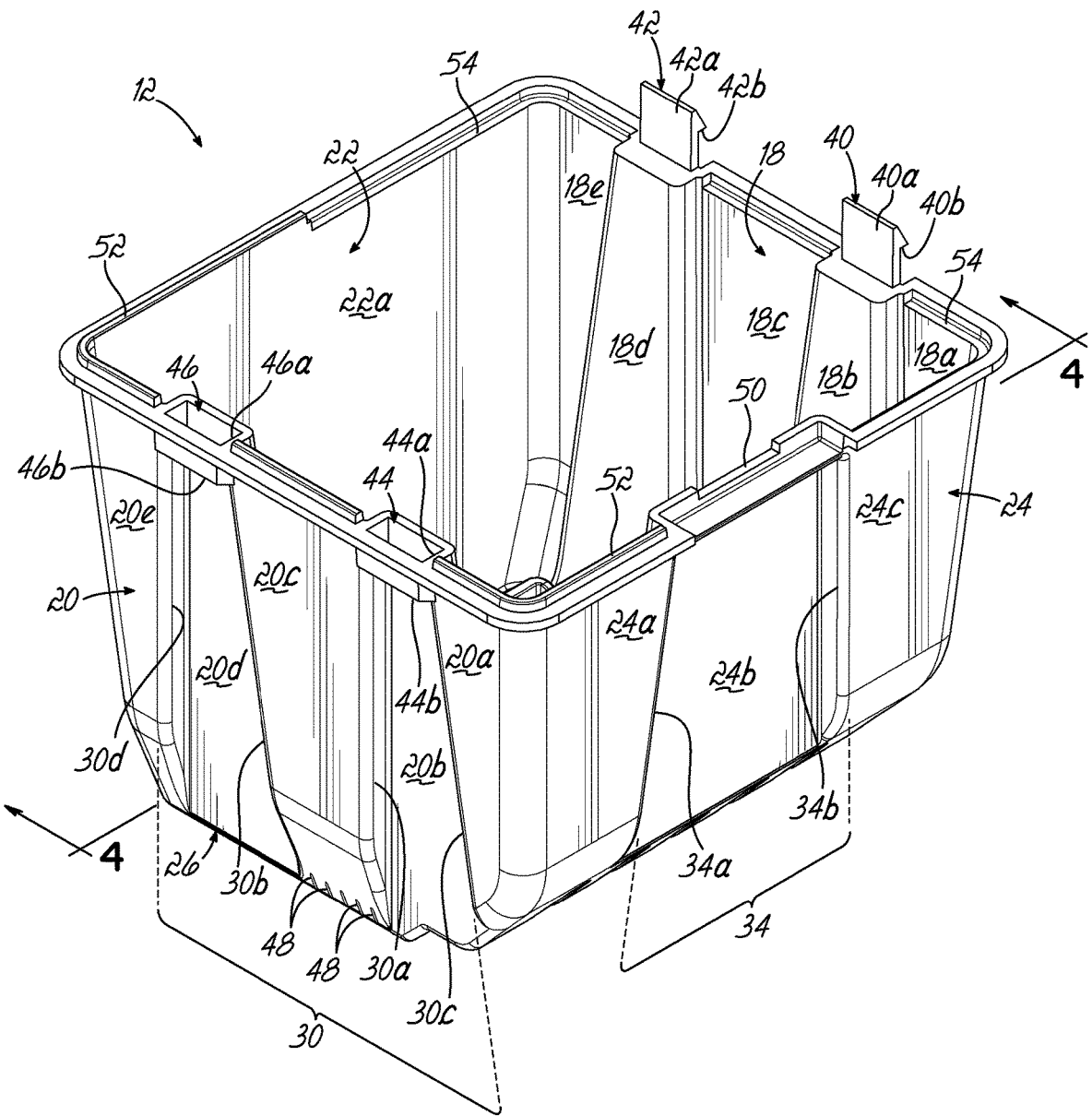
FIG. 2 is a rear perspective view of the first body portion of FIG. 1, taken from another angle.

Specifically as shown in FIG. 1, the first side wall 18 includes a first aligning portion 28, while the second side wall 20 includes a second aligning portion 30 (shown more clearly in FIG. 2). According to this exemplary embodiment, the first aligning portion 28 includes first and second inwardly tapering surfaces 28a-b as well as first and second outwardly tapering surfaces 28c-d with each of these aiding the first and second body portions 12, 112 in converting between the nested configuration and the closed configuration. Similarly, the second aligning portion 30 includes third and fourth inwardly tapering surfaces 30a-b as well as third and fourth outwardly tapering surfaces 30c-d which may each aid the first and second body portions 12, 112 in converting between the nested configuration and the closed configuration. Additionally, the fourth side wall 24 has a third aligning portion 34 containing fifth and sixth outwardly tapering surfaces 34a-b. In the context of this description, "inward" and "outward" taper are descriptive when viewing the first body portion 12 from a top open end to the bottom at the end wall 26.

The bee swarm box 10 may be made from any suitable material, such as a polymeric material providing for durability and ease of cleaning. For example, the first and second body portions 12, 112 may be produced using a three-dimensional printing apparatus (commonly referred to as a 3-D printer), where a non-transitory computer-readable medium encoded with instructions may define the bee swarm box 10. Of course, the bee swarm box 10 may be made in a different manner in other embodiments.

The first body portion 12 may include one or more locking structures and one or more corresponding receiving structures to lock the first and second body portions 12, 112 together in the closed configuration. As shown in FIG. 1, the first side wall 18 includes a first locking structure 40 and a second locking structure 42, while the second side wall 20 includes a first receiving structure 44 and a second receiving structure 46. In the embodiment shown, the first and second locking structures 40, 42 and the first and second receiving structures 44, 46 are each integrally formed as a unitary piece to the first body portion 12. Additionally, persons skilled in the art would appreciate the first and second locking structures 40, 42 and the first and second receiving structures 44, 46 may be located on any one of the first, second, third, or fourth side walls 18, 20, 22, 24 in any configuration that enables for suitable locking between the first and second body portions 12, 112. It is desirable that the first and second locking structures 40, 42 and the corresponding first and second receiving structures 44, 46 be able to hold the first and second body portions 12, 112 together when lifted, even if the bee swarm box 10 is full of bees and/or brood (which can weigh substantially more than the first and second body portions 12, 112 themselves).

The first and second locking structures 40, 42 of the first body portion 12 are configured to lock with the first and second receiving structures 144, 146 (shown in FIGS. 7 and 8) of the second body portion 112 to lock the first and second body portions 12, 112 together. Alternatively, or in addition to, the first and second locking structures 140, 142 of the second body portion 112 may lock with the first and second receiving structures 44, 46 of the first body portion 12. As shown in FIG. 1, the first and second locking structures 40, 42 each include a triangular shaped head element 40a, 42a and a shoulder portion 40b, 42b. As shown in FIG. 2, the first and second receiving structures 44, 46 include a rectangular aperture 44a, 46a bounded by a receiving surface 44b, 46b. This allows the triangular shaped head element 40a, 42a to pass through the rectangular aperture 44a, 46a, and the shoulder portion 40b, 42b to contact the receiving surface 44b, 46b to lock the first and second body portions 12, 112 together as more clearly shown in FIG. 9. The locking structures 40, 42 resiliently deflect to move through the rectangular apertures 44a, 46a, and then snap back to a rest position to retain the portions in place in the closed configuration. Persons skilled in the art would appreciate the locking and receiving structures may have any shape that suitably lock the first and second body portions 12, 112 together.

As shown in FIGS. 1 and 2, the first body portion 12 includes one or more drainage apertures 48. As more clearly shown in the top plan view of FIG. 6, the drainage apertures 48 are located both in the end wall 26 and in the first and second side walls 18, 20, and extend in a direction generally parallel to the third and fourth side walls 22, 24. Five drainage apertures 48 are shown grouped together in two distinct groupings. However, more or less drainage apertures 48 may be used in other embodiments. The drainage apertures 48 are sized so as to allow the bee swarm box 10 to drain fluids in the internal cavity 14, while simultaneously preventing bees from fitting through. The drainage apertures 48 also allow the internal cavity 14 of the bee swarm box 10 to suitably ventilate.

As shown in FIG. 1A, the first body portion 12 includes a first entrance portion 50 disposed on the fourth side wall 24 to allow the bees to enter and exit the bee swarm box 10 when the bee swarm box 10 is in the closed configuration. To aid in forming this closed configuration, the first body portion 12 also includes an outwardly extending lip portion 52 and a corresponding inwardly extending receiving portion 54. This allows the outwardly extending lip portion 52 of the first body portion 12 to align with the inwardly extending receiving portion 154 of the second body portion 112.

Figure 3:
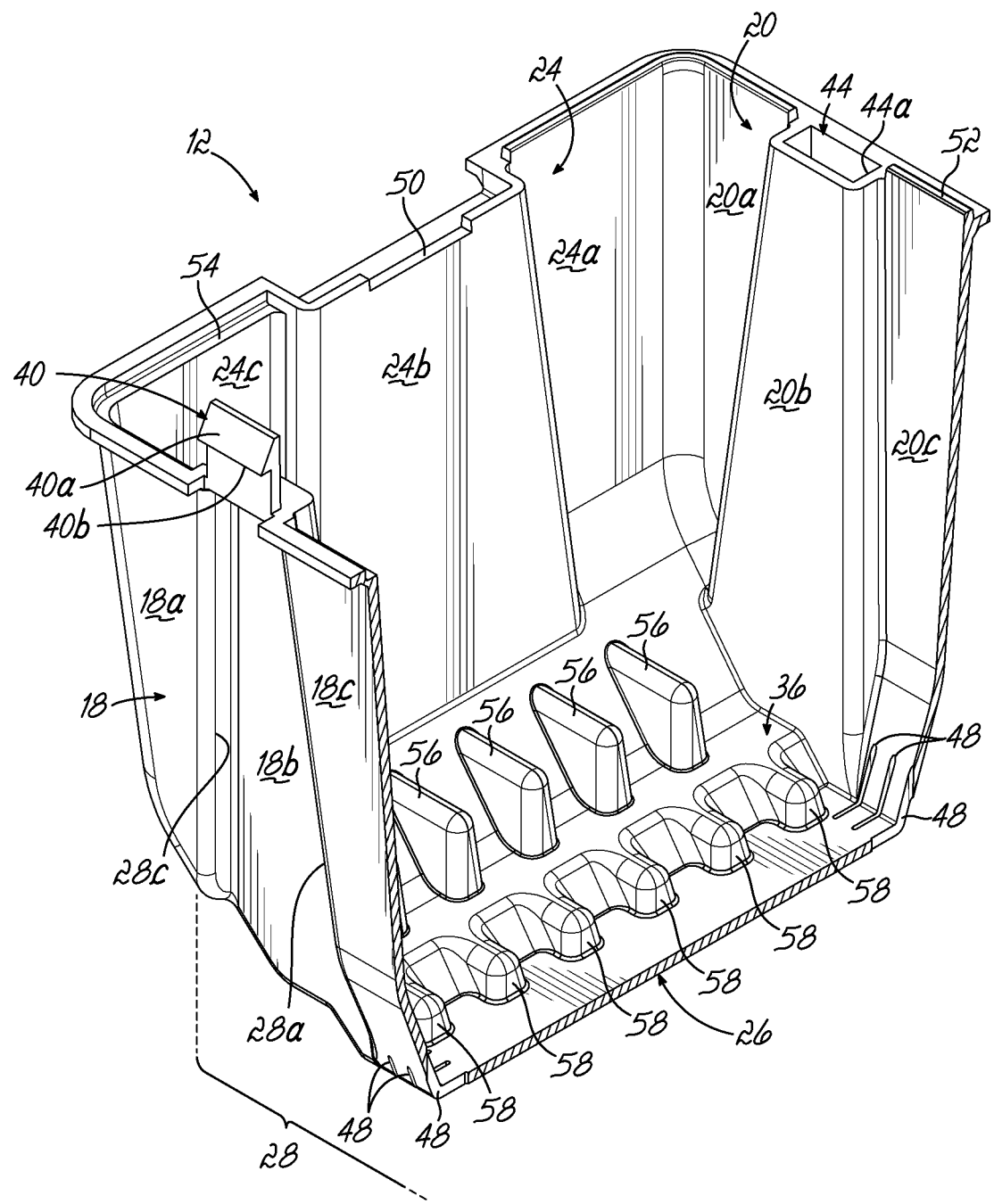
FIG. 3 is a cross-sectional front perspective view of the first body portion of FIG. 1, taken across line 3-3, revealing first upper and lower pluralities of generally parallel internal slots located on an end wall.
Figure 4:
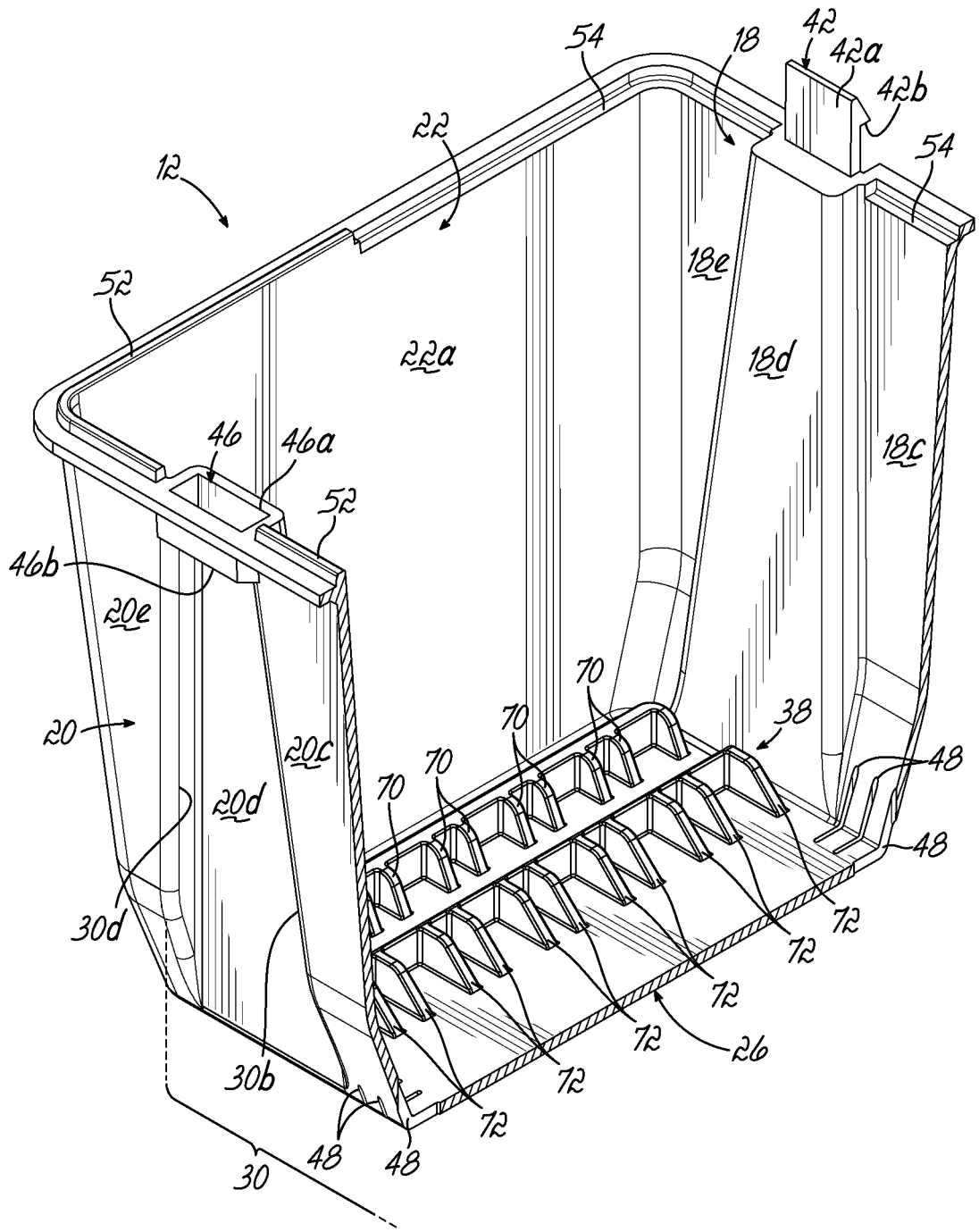
FIG. 4 is a cross-sectional rear perspective view of the first body portion of FIG. 2, taken across line 4-4, revealing second upper and lower pluralities of generally parallel internal slots located on the end wall.
Figure 5:
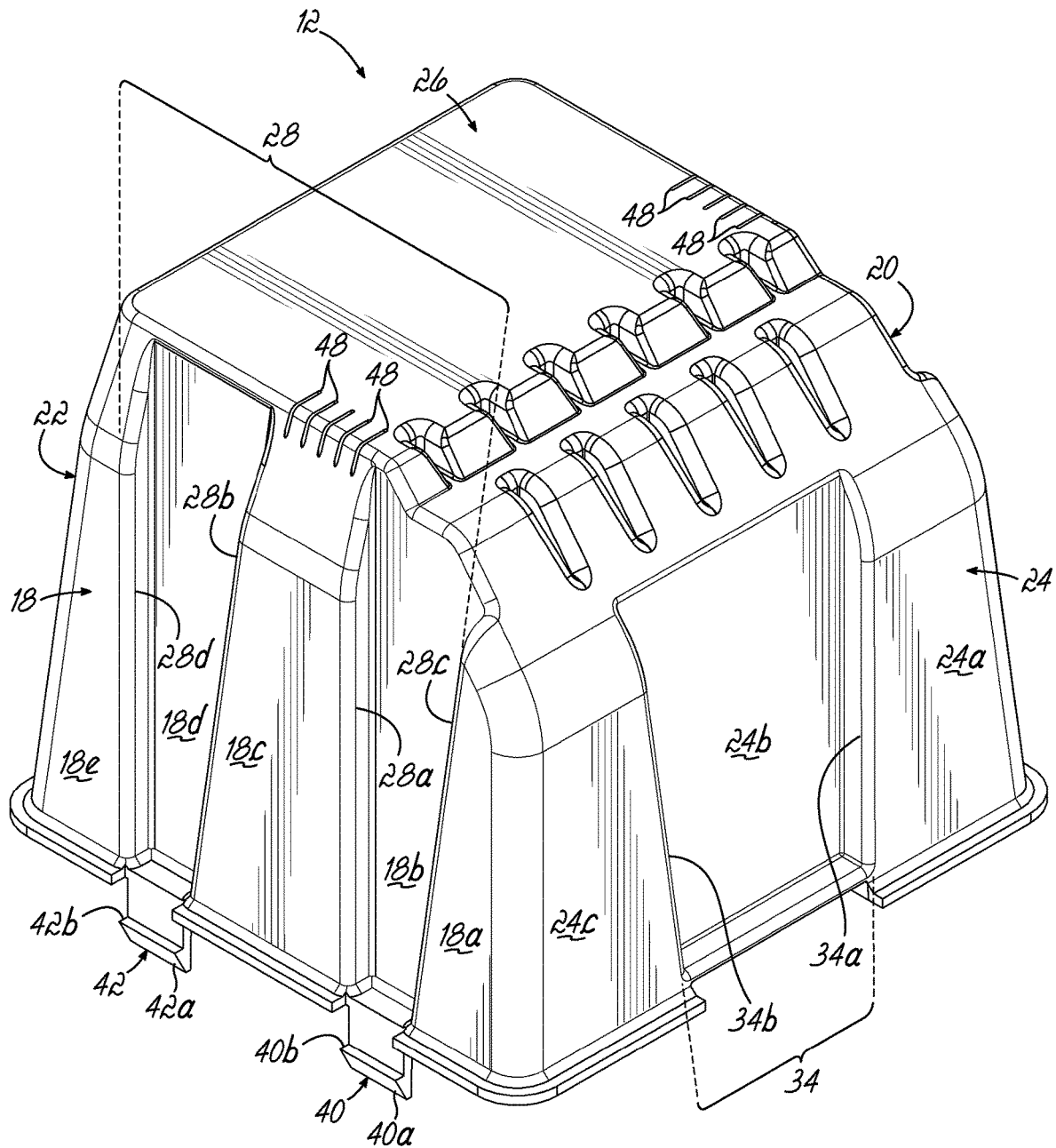
FIG. 5 is a bottom-side perspective view of the first body portion of FIG. 2, more clearly showing the end wall.
Figure 6:
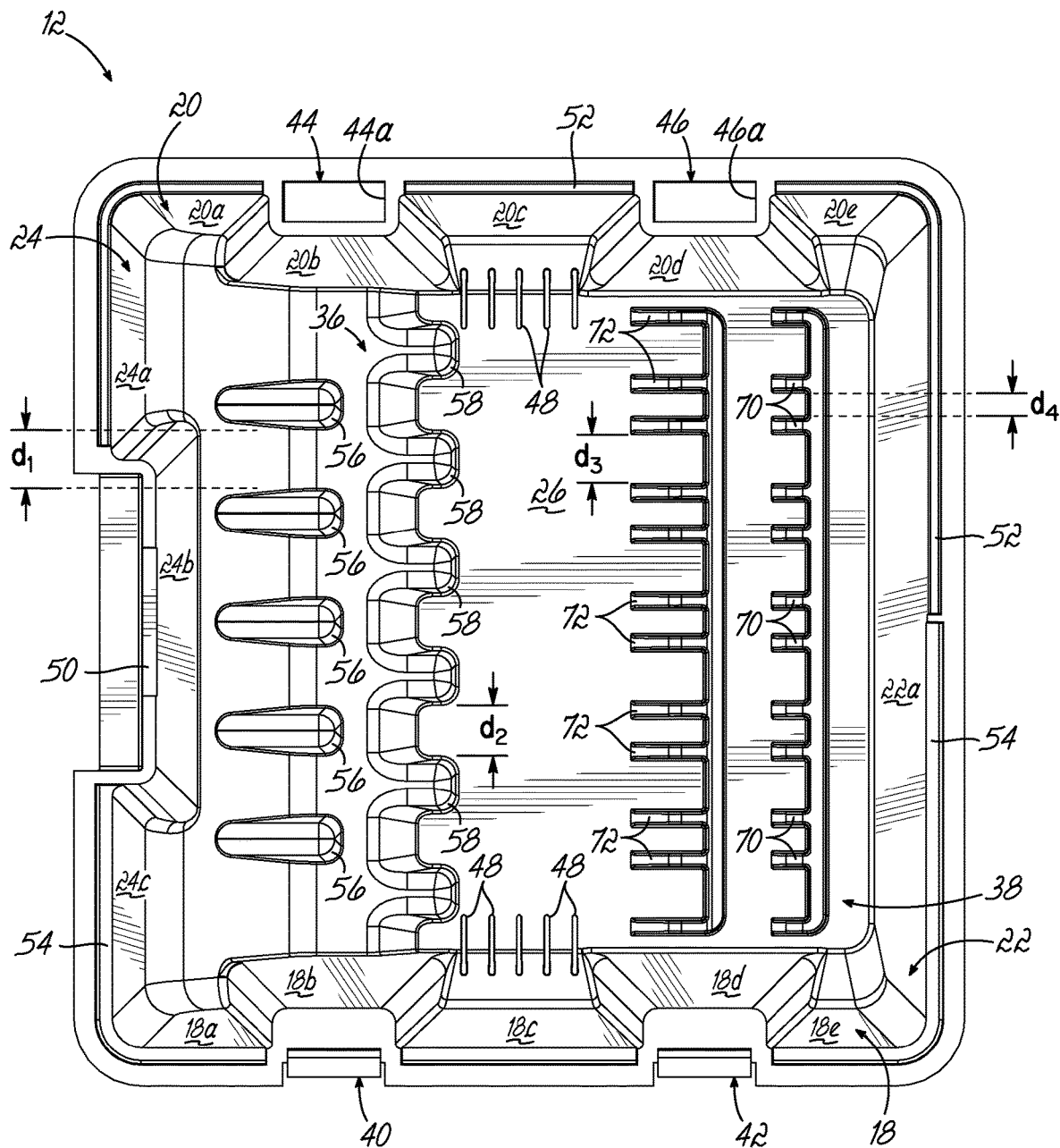
FIG. 6 is a top plan view of the first body portion with the first and second pluralities of generally parallel internal slots being located on the end wall.
Figure 7:
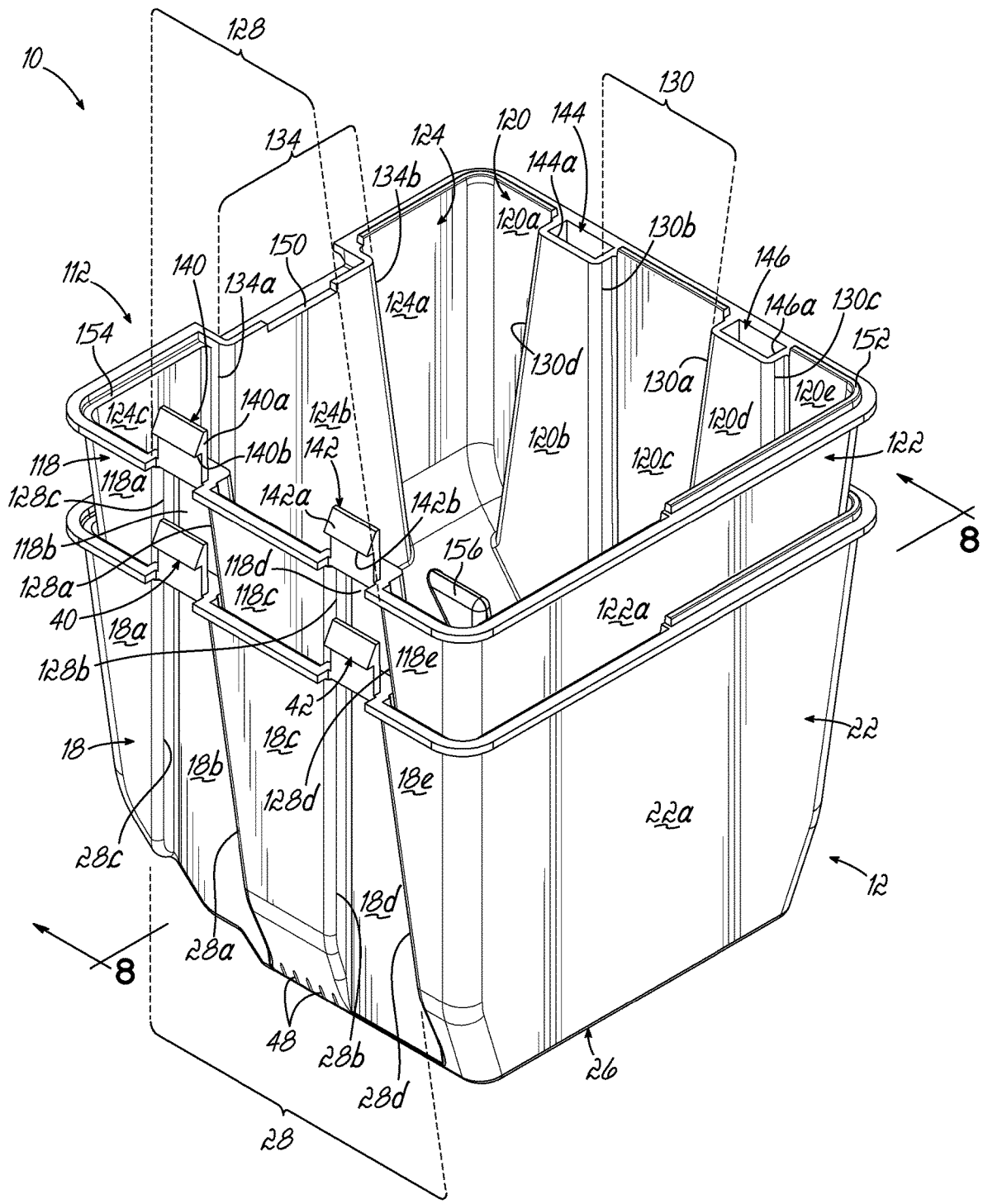
FIG. 7 is a perspective view of first and second body portions of the bee swarm box in a nested configuration.

Now with reference to FIGS. 3, 4, and 7, the end wall 26 may include first and second pluralities of generally parallel internal slots 36, 38. As shown in FIG. 3, the first plurality of generally parallel internal slots 36 include a first upper plurality of generally parallel internal slot projections 56 and a first lower plurality of generally parallel internal slot projections 58. The first upper and lower pluralities of generally parallel internal slot projections 56, 58 are configured to receive a first portion 60 of the first end 62 (shown in FIG. 1A) of the first plurality of framelike elements 16 or a second plurality of framelike elements (not shown) that are of a different shape and/or size than the first plurality of framelike elements 16. The slot projections 56, 58 are spaced apart by gaps which are sized to receive these portions of the framelike elements 16. The second body portion 112 (shown in FIGS. 7-9) is configured to receive the second ends 64 of the framelike elements 16. The second ends 64 are disposed opposite the first ends 62 and include a first portion 66 and a second portion 68 (as shown in FIGS. 1 and 1A).

As shown in FIG. 4, the second plurality of generally parallel internal slots 38 include a second upper plurality of generally parallel internal slot projections 70 and a second lower plurality of generally parallel internal slot projections 72. The second plurality of generally parallel internal slots 38 are configured to receive a second portion 74 of the first end 62 (shown in FIG. 1A) of the first plurality of framelike elements 16. The second upper and lower pluralities of generally parallel internal slot projections 70, 72 may also be configured to receive a second or third plurality of framelike elements (not shown). As shown in FIG. 1A, the second portion 74 of the first end 62 defines a projection that extends between two respective slot projections of either the second upper and lower pluralities of generally parallel internal slot projections 70, 72.

The spacing between the first upper and lower pluralities of generally parallel internal slot projections 56, 58, and/or the spacing between the second upper and lower pluralities of generally parallel internal slot projections 70, 72, is configured to allow for sufficient space for the bees to build a hive and/or for sufficient space between the first plurality of framelike elements 16. Based on the typical dimensions and differences between wooden and plastic frames, the gap spacing needs to be about 0.800 inches with some of the slot projections. As shown, the spacing ("d1") between the first upper plurality of generally parallel internal slot projections 56 is about 0.85 inches, the spacing ("d2") between the first lower plurality of generally parallel internal slot projections 58 is about 0.78 inches, the larger spacing ("d3") between the second upper and lower pluralities of generally parallel internal slot projections 70, 72 is about 0.72 inches, and the narrower spacing ("d4") between the second upper and lower pluralities of generally parallel internal slot projections 70, 72 is about 0.40 inches. Additionally as shown in the cross-sections of FIGS. 3 and 4, the first body portion 12 has a generally uniform thickness, however, a generally uniform thickness is not required.

Figure 8:
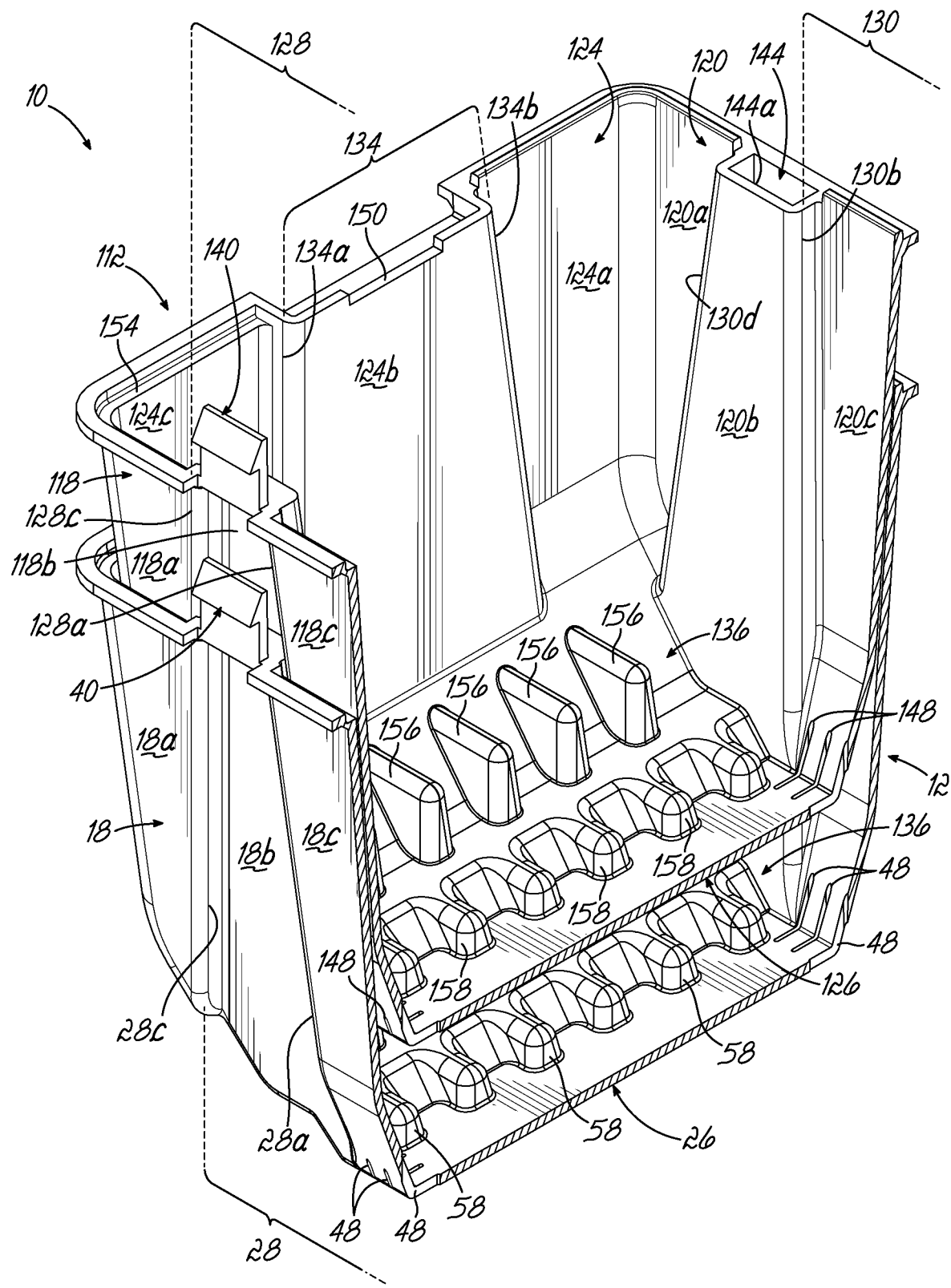
FIG. 8 is a cross-sectional view of FIG. 7, taken across line 8-8, showing the degree of nesting between the first and second body portions.
Figure 9:
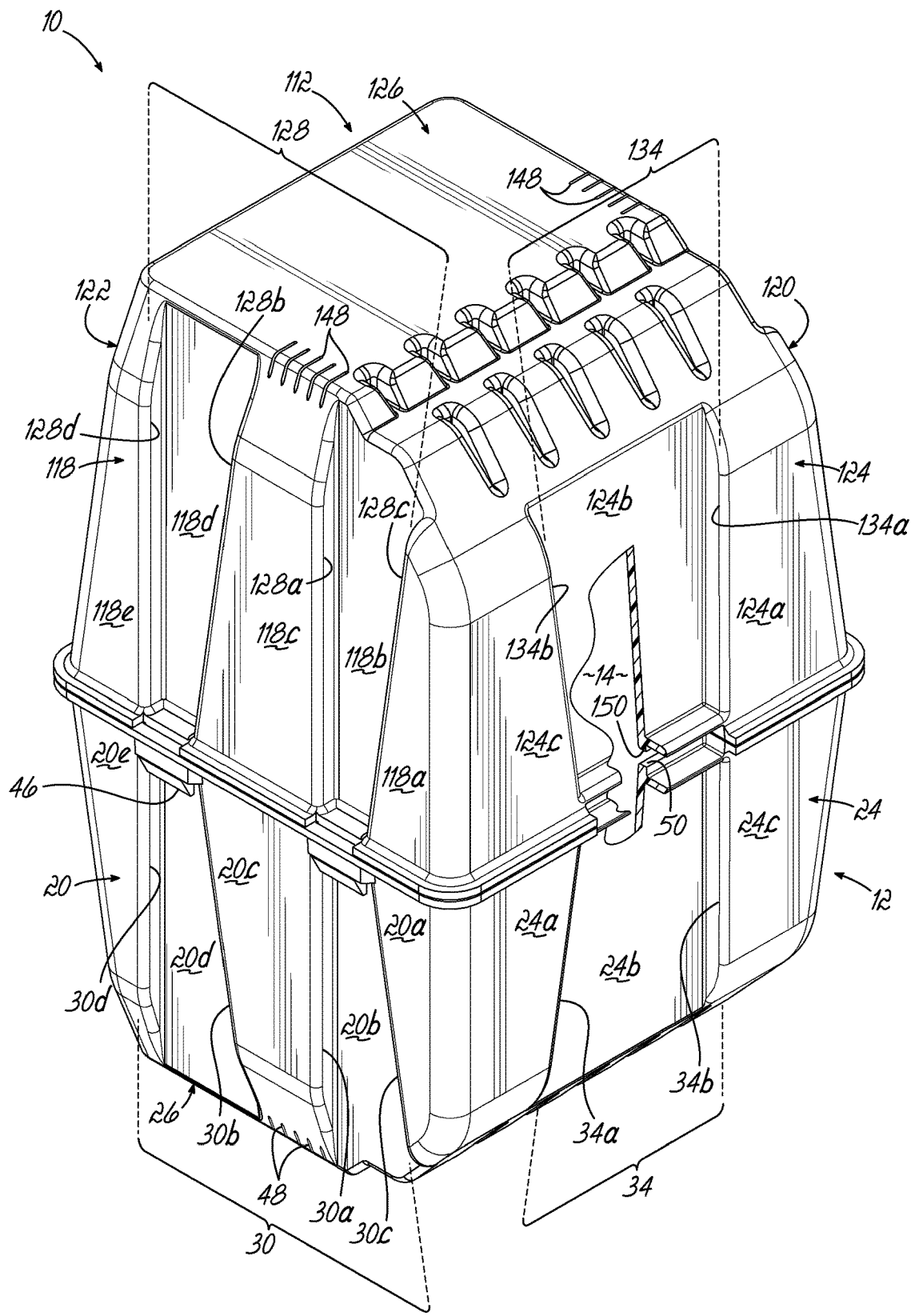
FIG. 9 is a perspective view of the first and second body portions of FIG. 7 in a closed configuration, thereby defining how the bee swarm box appears in use.

Now referring to FIGS. 7-9, the interaction between the first and second body portions 12, 112 is shown in further detail. The second body portion 112 includes many of the same elements as the first body portion 12, and these elements have been provided with similar reference numbers in the "100" series as set forth above. For example, the second body portion 112 of this embodiment again includes a first side wall 118, first narrowing portions 118a-e, a second side wall 120, second narrowing portions 120a-e, a third side wall 122, a third narrowing portion 122a, a fourth side wall 124, fourth narrowing portions 124a-c, an end wall 126, a first aligning portion 128, first and second inwardly tapering surfaces 128a-b, first and second outwardly tapering surfaces 128c-d, a second aligning portion 130, third and fourth inwardly tapering surfaces 130a-b, third and fourth outwardly tapering surfaces 130c-d, a third aligning portion 134, fifth and sixth outwardly tapering surfaces 134a-b, a first plurality of generally parallel internal slots 136, a first locking structure 140, a triangular shaped head element 140a, a shoulder portion 140b, a second locking structure 142, a triangular shaped head element 142a, a shoulder portion 142b, a first receiving structure 144, a rectangular aperture 144a, a second receiving structure 146, a rectangular aperture 146a, drainage apertures 148, a first entrance portion 150, a lip portion 152, a receiving portion 154, a first upper plurality of generally parallel internal slots 156, and a first lower plurality of generally parallel internal slots 158.

A method of using a bee swarm box 10 is also described. As discussed above, the bee swarm box 10 may be used to collect bees in one location for transfer to another location. As shown most clearly in FIG. 8, in the nested configuration, the first aligning portion 28 of the first body portion 12 projects so as to nest with the first aligning portion 128 of the second body portion 112 aiding the first and second body portions 12, 112 in forming the nested configuration. To this end, the end wall 126 of one body portion 112 is inserted into the internal cavity surrounded by the other body portion 12, thereby to bring the side walls into adjacent or abutting relationship. In the embodiment shown, the nested configuration reduces the space occupied by the first and second body portions 12, 112 by at least 50%, and preferably by at least 67%.

The method of converting from the nested configuration to the closed configuration includes transporting the bee swarm box 10 to a desired installation location while in the nested configuration, and then separating first and second body portions 12, 112 using a first aligning portion 28 of the first body portion 12 that slideably contacts a first aligning portion 128 of the second body portion 112. Once the first and second body portions 12, 112 are no longer nested, the method also includes inserting the first portion 60 of the first ends 62 of a first plurality of framelike elements 16 into a first plurality of generally parallel internal slots 36 (one or both of the first upper and lower plurality of generally parallel internal slot projections 56, 58) of the first body portion 12.

Instead of, or in addition to, inserting the first portion 60 of the first ends 62 of a first plurality of framelike elements 16 into a first plurality of generally parallel internal slots, the method may include inserting the second portions 74 of the first ends 62 of the first plurality of framelike elements 16 into the second plurality of generally parallel internal slots 38. Specifically, the second portions 74 of the first ends 62 may be inserted into one or both of the second upper and lower pluralities of generally parallel internal slot projections 70, 72. Similarly, the method may also include aligning the second portion 68 of the second ends 64 of the first plurality of framelike elements 16 into the second plurality of generally parallel internal slots 156, 158 of the second body portion 112.

The method also includes aligning the second ends 64 of the first plurality of framelike elements 16 disposed opposite the first ends 62 into a first plurality of generally parallel internal slots 156, 158 of the second body portion 112. The method also includes connecting the first and second body portions 12, 112 into the closed configuration to form an internal cavity 14 configured to receive bees and the first plurality of framelike elements 16.

FIG. 9 shows the closed configuration of the bee swarm box 10, where the first and second body portions 12, 112 are already connected together. As shown, the first entrance portion 50 of the first body portion 12 is aligned with the first entrance portion 150 of the second body portion 112 to collectively form an entrance for bees to enter and exit the bee swarm box 10. This is intended to be the sole entrance/ exit for bees relative to the bee swarm box 10. In the closed configuration, the internal cavity 14 has a volume of approximately one cubic foot, which is ideal for swarming and moving swarms or sub-colonies of bees. This one cubic foot volume box weighs about thirty-five pounds when full with bees and honey, making it easily carried from location to location. However, persons skilled in the art would appreciate that a smaller or greater volume may be preferred depending on the application. For example, a smaller "nuke" box may be desired. Furthermore, the bee swarm box 10 may also include a removable plastic insert (not shown), which is placed into the entrance portions 50, 150 to block entry and exit of bees when the box 10 is to be transported from one location to another (such as during relocation of a bee swarm) after being filled with framelike elements and bees.

With reference to FIGS. 10-17, another embodiment of a bee swarm box 210 is shown in detail in accordance with this invention. This bee swarm box 210 includes many of the same elements as the previously described embodiment (bee swarm box 10), and these elements have been provided with similar reference numbers in the "200" series or the "300" series where the elements are substantially similar or identical. Therefore, much like the previous embodiment, the bee swarm box 210 converts the first body portion 212 and second body portion 312 (described in relation to FIGS. 16 and 17) between the nested configuration and the closed configuration.

As shown in FIGS. 10-15, the first body portion 212 includes many of the same elements as the first body portion 12. For example, the first body portion 212 of this embodiment again includes a first side wall 218, a second side wall 220, a third side wall 222, a fourth side wall 224, an end wall 226, a first plurality of generally parallel internal slots 236, drainage apertures 248, a first entrance portion 250, a lip portion 252, a receiving portion 254, a first upper plurality of generally parallel internal slot projections 256, and a first lower plurality of generally parallel internal slot projections 258. Although many of these elements have slightly modified shapes or profiles in this embodiment, the bee swarm box 210 and its elements function as described above except where the differences are outlined in further detail below (the detailed description of these identical or substantially similar elements is largely not repeated herein for the sake of brevity).

The first, second, third, and fourth side walls 218, 220, 222, 224 of the first body portion 212 define inwardly tapering surfaces 218a, 220a, 222a, 224a that aid the first and second body portions 212, 312 in forming the nested configuration. The inward taper causes an increase in box cross-sectional area towards the open end opposite the end wall 226. Additionally, first and second legs 282, 284 are disposed on the end wall of the first and second body portions 212, 312 help to stabilize the bee swarm box 210.

Figure 10:
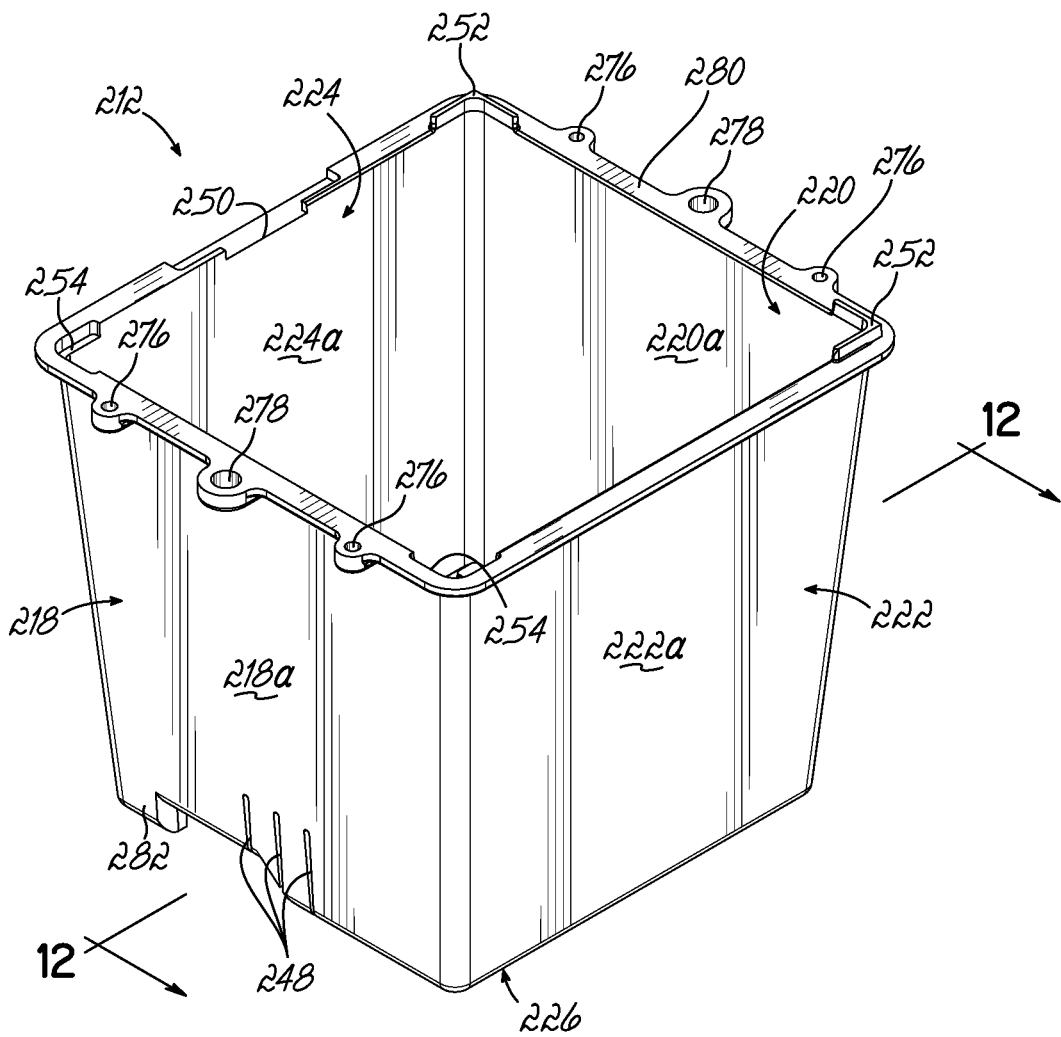
FIG. 10 is a front perspective view of another embodiment of a first body portion of a bee swarm box in accordance with the principles of the present invention.
Figure 11:
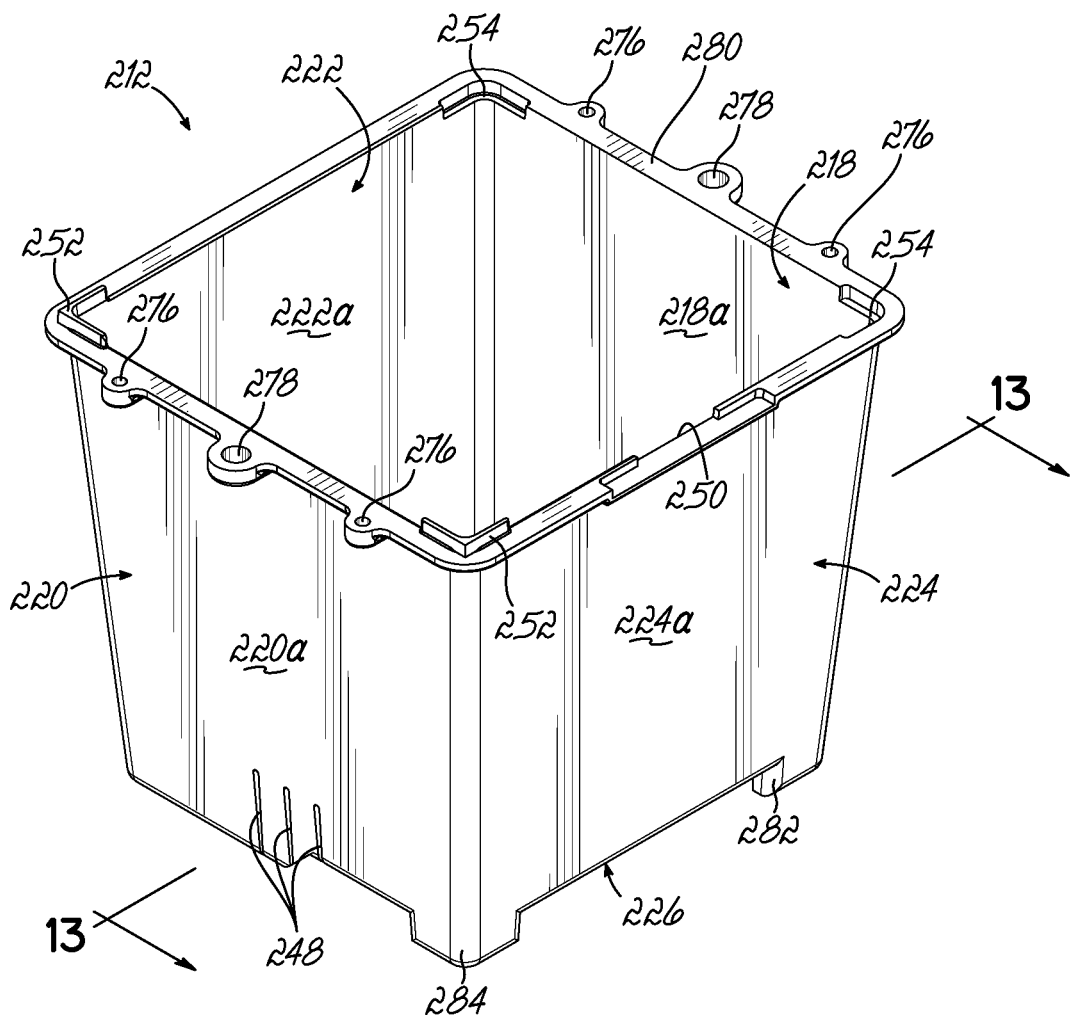
FIG. 11 is a rear perspective view of the first body portion of FIG. 10, taken from another angle.

The first body portion 212 may also include one or more smaller apertures 276 and one or more larger apertures 278 that may be located on a top peripheral edge 280 of the first body portion 212. As shown in FIGS. 10 and 11, the top peripheral edge 280 of the first and second side walls 218, 220 each include a larger aperture 278 located between two smaller apertures 276. As shown, the smaller apertures 276 may be used to lock the first and second body portions 212, 312 together, possibly using a locking element (not shown). The locking element may be, for example, a zip tie, a rope, a fastener, or another element that suitably locks the first and second body portions 212, 312 together. In the embodiment shown, the larger apertures 278 serve as hanging structure, where a rope or some other hanging element is coupled between the large aperture 278 of the first side wall 218 and the larger aperture 278 of the second side wall 220. The hanging structures are configured to allow the bee swarm box 210 to hang from an object in the closed configuration. For example, the bee swarm box 210 may hang on a structure, such as a tree, a residential or commercial building, a pole, a temporary structure, or any other suitable structure. However, persons skilled in the art would appreciate that the smaller apertures 276 and larger apertures 278 may serve a variety of different purposes.

Figure 15:
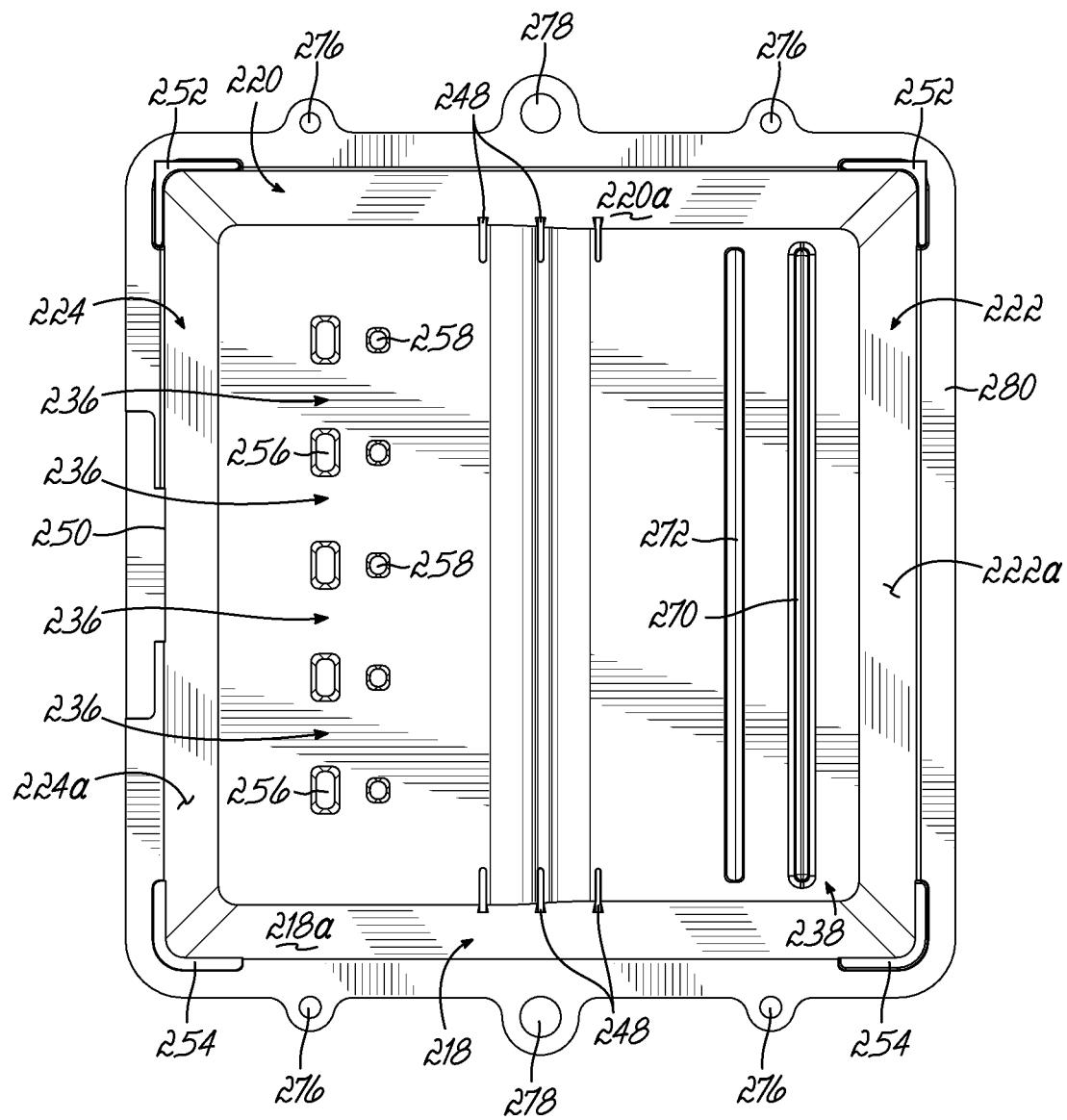
FIG. 15 is a top plan view of the first body portion of FIG. 10 with the first and second pluralities of generally parallel internal slots being located on the end wall.

Similar to the first and second body portions 12, 112 discussed above, the first plurality of generally parallel internal slots 236 of the first and second body portions 212, 312 is configured to receive a first portion 60 of the first end 62 (shown in FIG. 1A) of the first plurality of framelike elements 16 or a second plurality of framelike elements (not shown) that are of a different shape and/or size than the first plurality of framelike elements 16. Each of the first plurality of generally parallel internal slots 236 extends in a transverse direction between adjacent pairs of the upper plurality of generally parallel internal slot projections 256. Similarly, each of the first plurality of generally parallel internal slots 236 extends in a transverse direction between adjacent pairs of the lower plurality of generally parallel internal slot projections 258. The gaps located between the slot projections 256, 258 define the transverse width of the first plurality of generally parallel internal slots 236 and are once again sized to receive the framelike elements 16. To this end, when the framelike elements 16 are inserted into the generally parallel internal slots 236, the framelike elements 16 extend through the internal slots 236 in a first direction which is transverse to a second direction that the rails 270, 272 extend longitudinally across the end wall 226 as shown in FIG. 15. The second body portion 312 (shown in FIGS. 16 and 17) is configured to receive the second ends 64 of the framelike elements 16. The second ends 64 are disposed opposite the first ends 62 and include a first portion 66 and a second portion 68 (as shown in FIGS. 1 and 1A).

Figure 12:
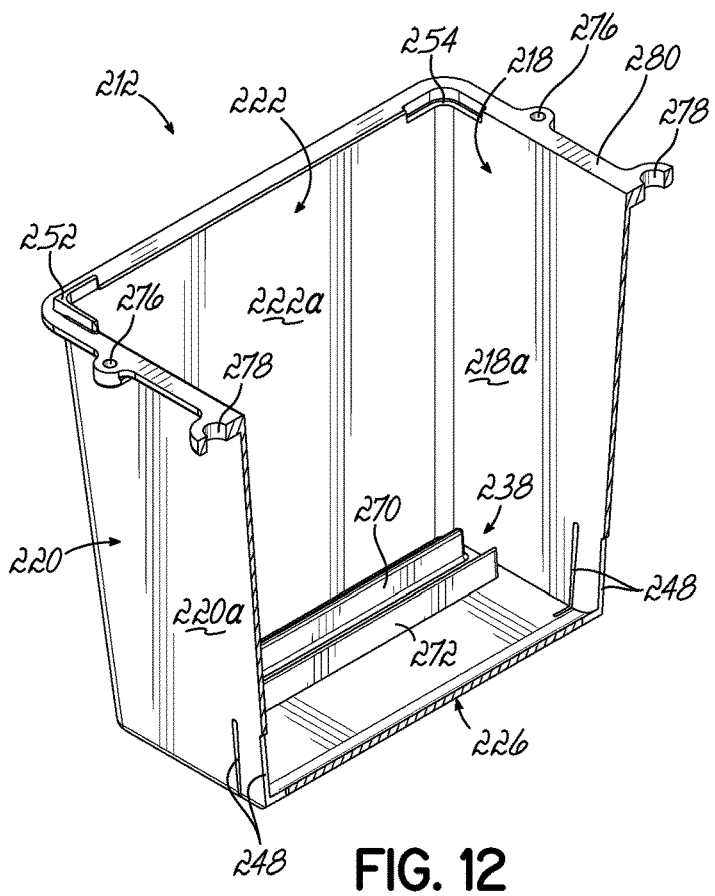
FIG. 12 is a cross-sectional front perspective view of the first body portion of FIG. 10, taken across line 12-12, revealing first and second rails located on the end wall.
Figure 13:
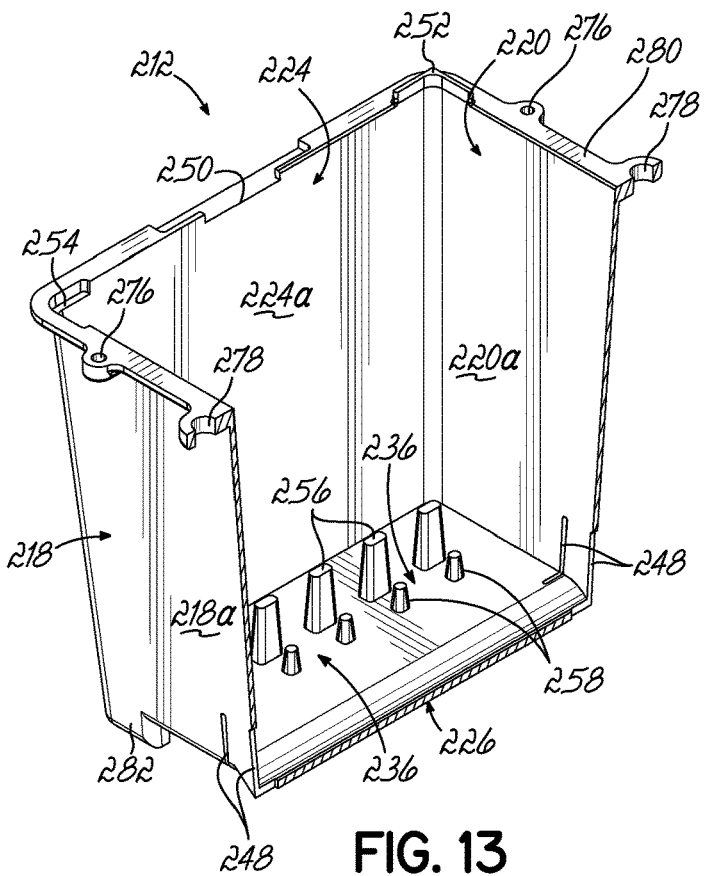
FIG. 13 is a cross-sectional rear perspective view of the first body portion of FIG. 11, taken across line 13-13, revealing first upper and lower pluralities of generally parallel internal slots located on an end wall.
Figure 14:
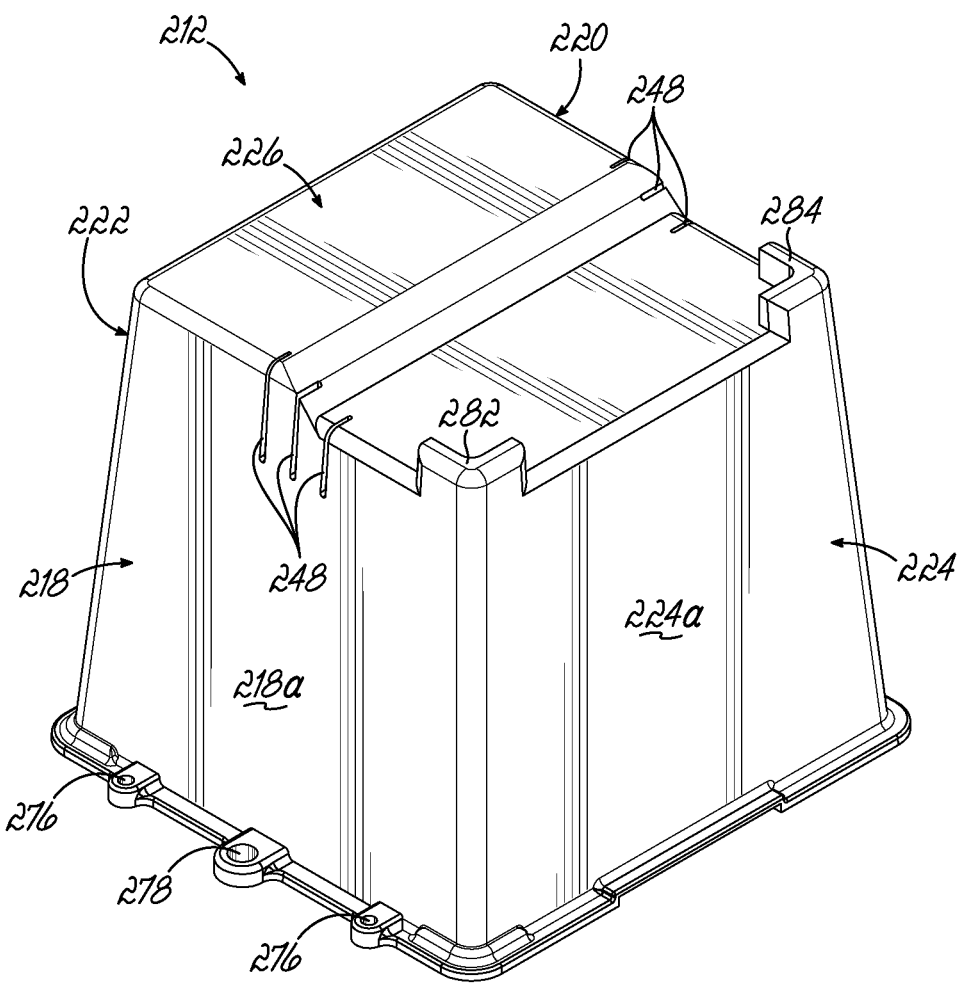
FIG. 14 is a bottom-side perspective view of the first body portion of FIG. 10, more clearly showing the end wall.

As shown in FIGS. 12 and 15, the second plurality of generally parallel internal slots 38 of the previous embodiment is replaced with a second receiving structure 238 defined by a first rail 270 and a second rail 272. The first and second rails 270, 272 are configured to abut a second portion 74 of the first end 62 (shown in FIG. 1A) of the first plurality of framelike elements 16. The second receiving structure 238 may also be configured to receive a second or third plurality of framelike elements (not shown). As shown in FIG. 1A, the second portion 74 of the first end 62 includes a projection that extends into an elongated lateral gap defined between the first and second rails 270, 272.

Figure 16:
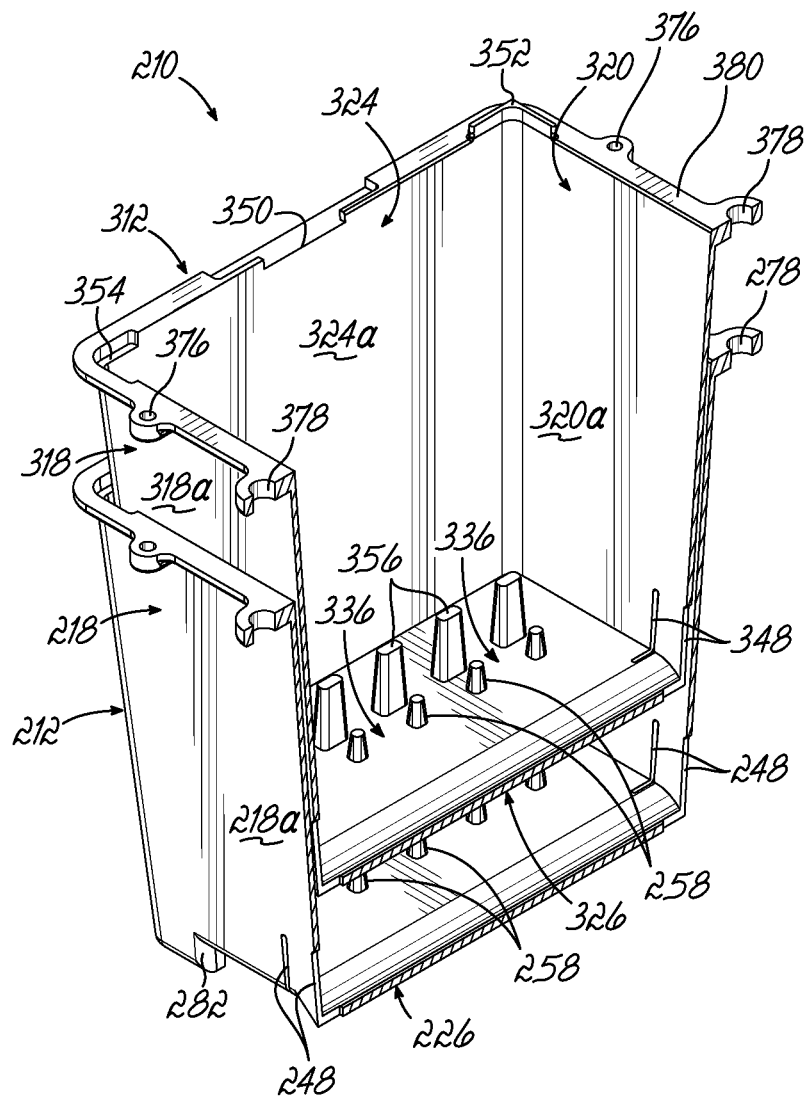
FIG. 16 is a cross-sectional view similar to FIG. 13 showing the degree of nesting between first and second body portions of the bee swarm box.
Figure 17:
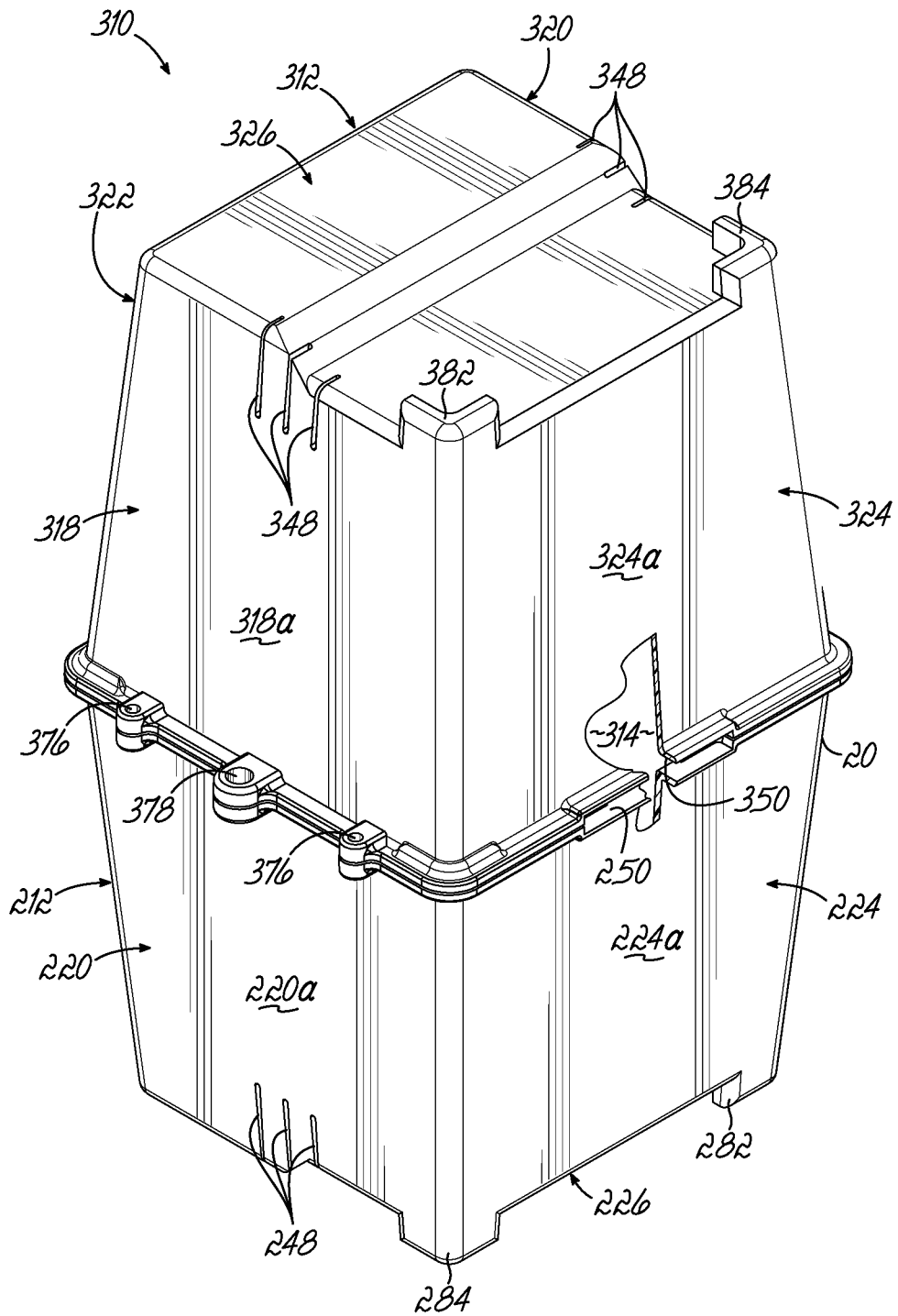
FIG. 17 is a perspective view of the first and second body portions of the bee swarm box of FIG. 16 in a closed configuration.

Now referring to FIGS. 16 and 17 that show the interaction between the first and second body portions 212, 312. The second body portion 312 includes many of the same elements as the first body portion 212, and these elements have been provided with similar reference numbers in the "300" series where the shown elements are substantially similar or identical. For example, the second body portion 312 of this embodiment again includes a first side wall 318, a first inwardly tapering surface 318a, a second side wall 320, a second inwardly tapering surface 320a, a third side wall 322, a fourth side wall 324, a fourth inwardly tapering surface 324a, an end wall 326, a first plurality of generally parallel internal slots 336, drainage apertures 348, a first entrance portion 350, a lip portion 352, a receiving portion 354, a first upper plurality of generally parallel internal slots 356, a first lower plurality of generally parallel internal slots 358, one or more smaller apertures 376, one or more larger apertures 378, a top peripheral edge 380, a first leg 382, and a second leg 384.

Once the bee swarm box 10, 210 is in the closed configuration, the bee swarm box 10 may be used as a beekeeper trap to control swarms by moving bees to another location for swarming, and/or be placed in natural habitats of bees to collect and promote the bee population (such as in specific locations in national parks). Although not shown, the bee swarm box 10, 210 may be loaded with a suitable bait to encourage bees to enter through the entrance into the interior of the bee swarm box 10, 210. Additionally, it may also be beneficial to locate the bee swarm box 10, 210 at a location away from a residential building, to draw bees away from the residential building and into a location where the bees can be more suitably captured without danger to people near the residential building. For this reason, the use of the bee swarm box 10, 210 may also be characterized as a method of pulling bees away from a residential building. The portability offered by the nested configuration and the ability to receive conventional sized bee hive frames to perform the functions above in the closed configuration collectively provide advantages to those managing bee populations.

The present invention has been illustrated by the description of one or more embodiments thereof, and the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus, and method and illustrative examples shown and described. Accordingly, departures may be made from such details without departing from the scope or spirit of the general inventive concept.

What is claimed is:

1. A bee swarm box comprising:
a first plurality of bee hive frames, each of the bee hive frames defining a generally rectangular-shaped frame-like element extending longitudinally between first and second ends;
a first body portion including a plurality of side walls extending from an end wall to form an internal cavity, the end wall including a set of first and second rails each extending in length across a majority of a width of the end wall and each located on the end wall spaced apart from any of the plurality of side walls, and the end wall also including a first plurality of generally parallel internal slots, wherein the first plurality of generally parallel internal slots receives the first ends of the first plurality of bee hive frames when the bee hive frames move into contacting engagement with one of the first and second rails of the first body portion, wherein the first plurality of generally parallel internal slots are oriented such that when the bee hive frames are inserted into the generally parallel internal slots, the bee hive frames extend through the generally parallel internal slots in a first direction which is transverse to a second direction that the first and second rails extend in length across the end wall; and
a second body portion including a plurality of side walls extending from an end wall to form an internal cavity, the end wall of the second body portion including a set of first and second rails each extending in length across a majority of a width of the end wall and each located on the end wall spaced apart from any of the plurality of side walls, and the end wall also including a first plurality of generally parallel internal slots, wherein the first plurality of generally parallel internal slots receives the second ends of the first plurality of bee hive frames when these bee hive frames move into contacting engagement with one of the first and second rails of the second body portion, the second ends being disposed opposite the first ends, the first and second body portions being convertible between a closed configuration and a nested configuration,
wherein in the closed configuration, the internal cavities of the first and second body portions are brought together and are configured to both receive bees and enclose the first plurality of bee hive frames, a spacing between the first plurality of generally parallel internal slots of the first and second body portions being configured to allow for sufficient space for the bees to build a hive between adjacent ones of the plurality of bee hive frames, and
wherein in the nested configuration, the end wall of the first body portion is inserted into the internal cavity of the second body portion so that the plurality of side walls of the first body portion contact the plurality of side walls of the second body portion in adjacent relation, the nested configuration saving space when transporting the bee swarm box between locations.

2. The bee swarm box of claim 1, wherein at least one of the plurality of side walls for each of the first and second body portions tapers inwardly to aid the first and second body portions in forming the nested configuration.

3. The bee swarm box of claim 1, wherein the first and second body portions each include a second plurality of generally parallel internal slots in the end wall configured to receive portions of the bee hive frames.

4. The bee swarm box of claim 1, wherein the spacing between the first plurality of generally parallel internal slots of the first and second body portions is between about 0.78-0.85 inches.

5. The bee swarm box of claim 1, wherein each of the first and second body portions further comprises an entrance portion disposed on one of the plurality of side walls of the respective first and second body portions, the entrance portion of the first and second body portions aligning in the closed configuration to collectively form an entrance for bees to enter and exit the bee swarm box.

6. The bee swarm box of claim 1, wherein each of the first and second body portions further comprises one or more drainage apertures that are suitably sized both to allow drainage of fluids from the internal cavity and to prevent bees from fitting through.

7. The bee swarm box of claim 1, wherein each of the first and second body portions further comprises one or more hanging structures configured to allow the swarm box to hang from an object.

8. The bee swarm box of claim 1, wherein the nested configuration reduces the space occupied by the first and second portions by at least 50%.

9. The bee swarm box of claim 1, wherein the internal cavity in the closed configuration has a volume of approximately one cubic foot, thereby providing sufficient space for swarming of bees to be effective.

10. The bee swarm box of claim 1, wherein the bee swarm box is made from a polymeric material.

* * * * *